July 6, 1965 W. F. WESLEY ETAL 3,193,022
TILLER
Filed Sept. 20, 1961 7 Sheets-Sheet 1

INVENTORS
WARREN F. WESLEY
CECIL E. POND
BY
M. A. Hobbs
ATTORNEY

July 6, 1965    W. F. WESLEY ETAL    3,193,022
TILLER

Filed Sept. 20, 1961    7 Sheets-Sheet 3

INVENTORS
WARREN F. WESLEY
CECIL E. POND
BY
*M. A. Hobbs*
ATTORNEY

July 6, 1965 W. F. WESLEY ETAL 3,193,022
TILLER
Filed Sept. 20, 1961 7 Sheets-Sheet 4

INVENTORS
WARREN F. WESLEY
CECIL E. POND
BY
*M. A. Hobbs*
ATTORNEY

July 6, 1965 W. F. WESLEY ETAL 3,193,022
TILLER
Filed Sept. 20, 1961 7 Sheets-Sheet 6
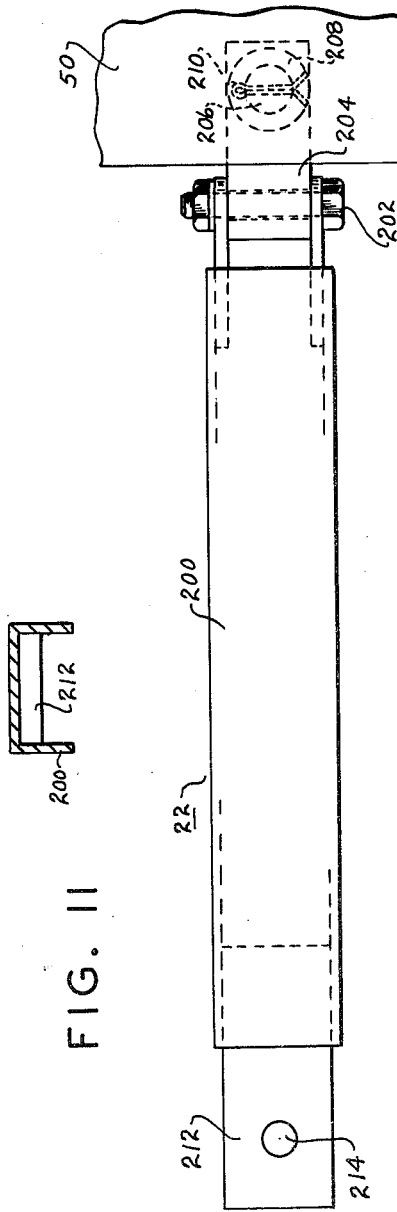
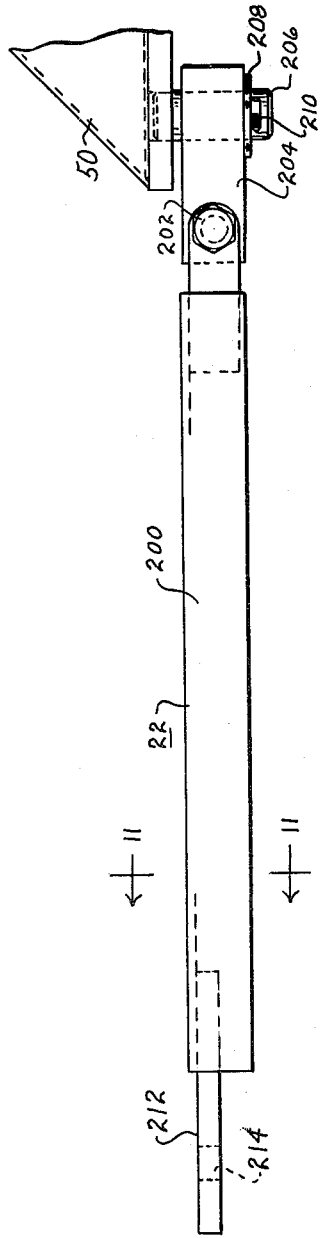
FIG. 11 FIG. 9 FIG. 10
INVENTORS
WARREN F. WESLEY
CECIL E. POND
BY
ATTORNEY July 6, 1965 W. F. WESLEY ETAL 3,193,022
TILLER
Filed Sept. 20, 1961 7 Sheets-Sheet 7

INVENTORS
WARREN F. WESLEY
CECIL E. POND
BY
*m. a. Hobbs*
ATTORNEY

United States Patent Office 3,193,022
Patented July 6, 1965

3,193,022
TILLER
Warren F. Wesley and Cecil E. Pond, South Bend, Ind., assignors to Wheel-Horse Products, Inc., South Bend, Ind., a corporation of Indiana
Filed Sept. 20, 1961, Ser. No. 139,408
9 Claims. (Cl. 172—76)

The present invention relates to a soil working implement and more particularly to a power driven tiller for use primarily with a tractor or the like.

With the rapid growth of suburban home and estate developments and the increased size of lawn and garden area around each home, there has been a corresponding demand for power implements, including small tractors for performing much of the work involved in the care of these larger areas. A variety of implements including plows, tooth and disc-type harrows and cultivators are available for use with the small tractors for preparing soil for planting either the lawn or garden. However, this requires several separate pieces of equipment which often enhances the initial cost excessively for the number of operations requiring this equipment and causes a storage problem throughout much of the year, particularly in view of the limited use of the equipment even during the season in which the equipment is normally used. It is therefore one of the principal objects of the present invention to provide a single implement for performing effectively the operations performed by the foregoing separate pieces of equipment.

Another object of the present invention is to provide an easily handled and operated soil working power implement which can be pulled by a tractor or the like for covering large areas in a relatively small amount of time, and can be pushed manually for working small and confined areas, and working in and around shrubbery, trees and other plants, and along fences and near buildings and walls.

Still another object of the invention is to provide a tiller of the aforesaid type which effectively works the soil deeply to the extent normally worked by plows, and which covers a relatively wide strip of ground in a single pass thereover such that reworking with a harrow or the like is unnecessary.

A further object is to provide a compact, versatile tiller which can be used to perform the soil working operation without any special skill or careful attention on the part of the operator, and which can be used to prepare new ground for cultivation or to rework previously cultivated ground without any change in the method of operation or in implement attachments.

Another object of the invention is to provide a tiller having a pair of rotary blade sets supported by a single centrally positioned member which effectively works the soil fully between the outer ends of the rotary blade sets without any unworked strip at the center between the two sets of blades.

Another object of the invention is to provide a rotary blade set which is so designed and constructed that it efficiently and thoroughly works the soil to a substantial and constant predetermined depth without any special manipulations of the implement being required, and which can be readily serviced to maintain the blades in optimum operating condition.

Additional objects and advantages of the present invention will become apparent from the following description and accompanying drawings, wherein:

FIGURE 9 is a top plan view of the hitch for connecting the tiller to a tractor;

FIGURE 10 is a side elevational view of the hitch shown in FIGURE 9;

FIGURE 11 is a vertical cross sectional view of the hitch, taken on line 11—11 of FIGURE 10;

Figure 1:
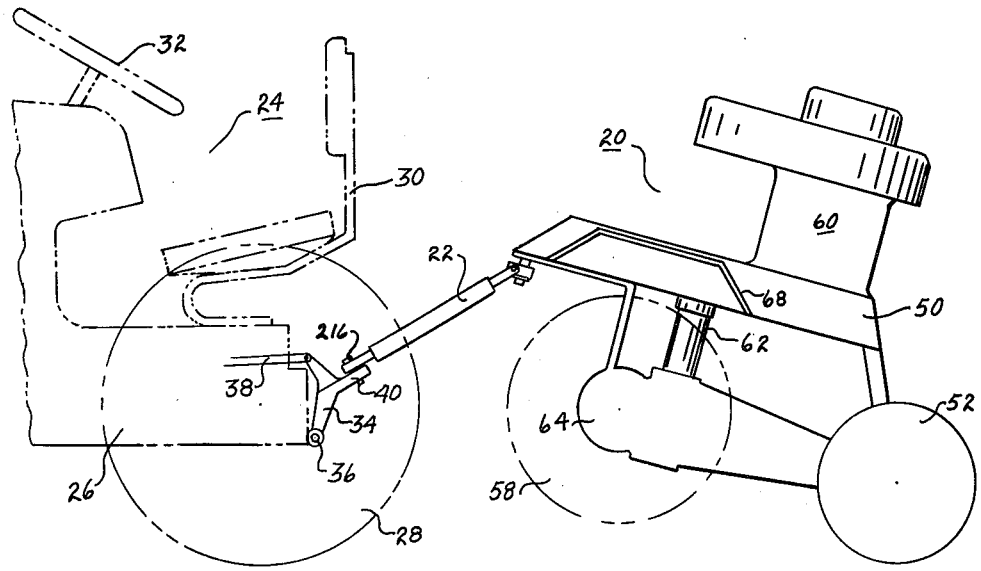
FIGURE 1 is a side elevational view of my tiller showing it attached to a conventional suburban tractor, and showing the tiller in its inoperable position.
Figure 2:
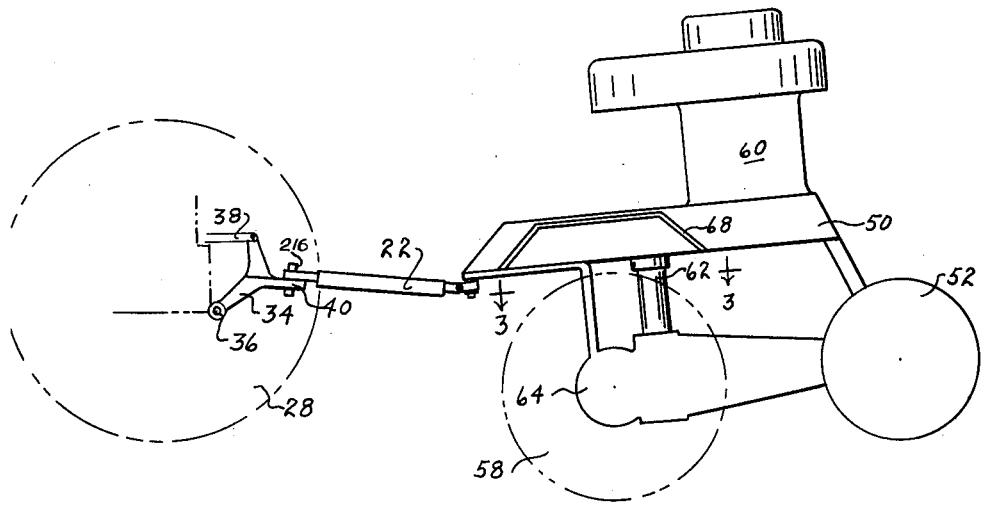
FIGURE 2 is a view similar to FIGURE 1, showing my tiller in operating position.
Figure 3:
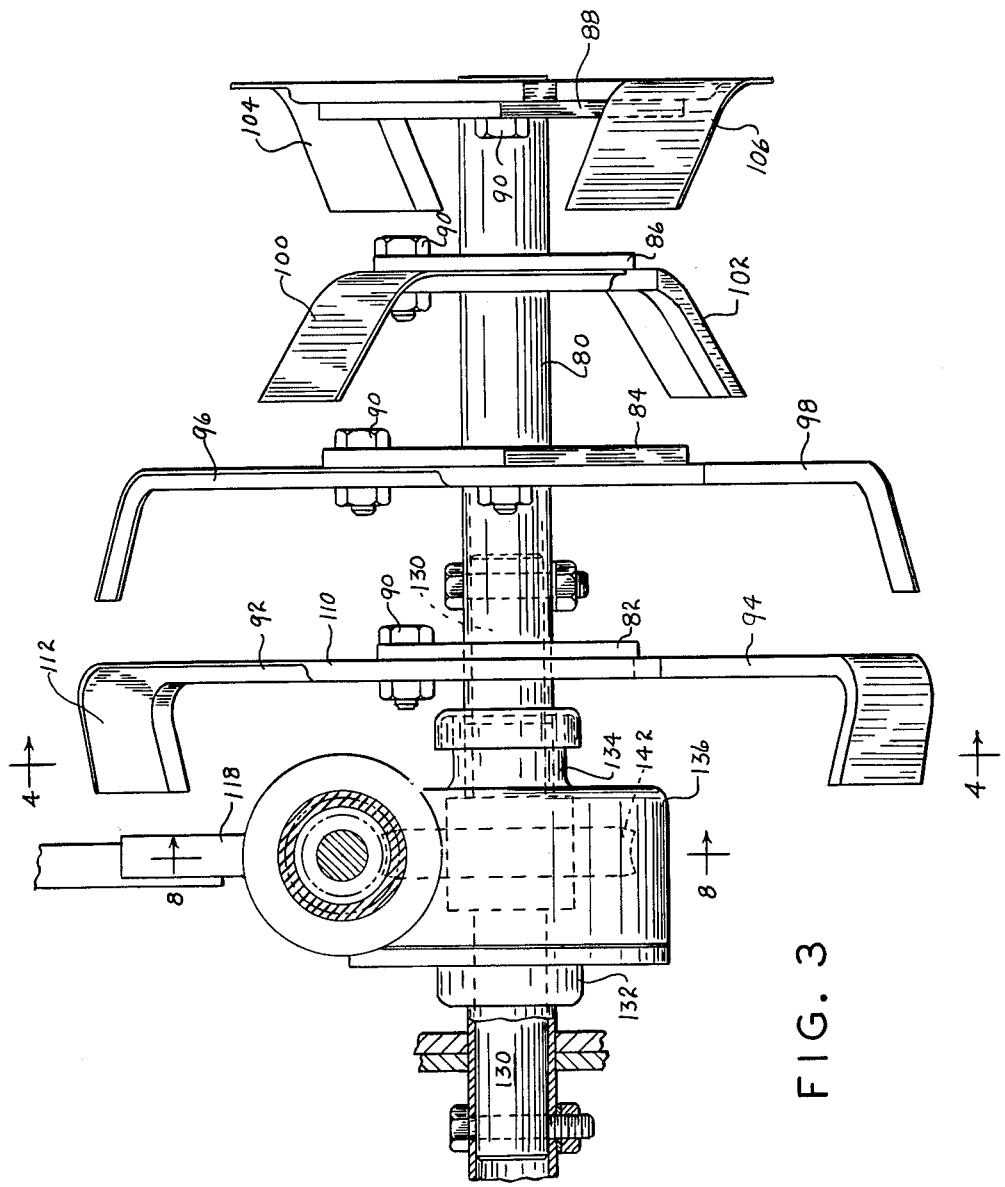
FIGURE 3 is a horizontal cross sectional view of the tiller, taken on line 3—3 of FIGURE 2, showing one set of rotary blades in elevation.

Referring more specifically to the drawings and to FIGURES 1 and 2 in particular, numeral 20 designates generally the present tiller in its inoperative position, connected by a hitch 22 to a suburban tractor 24, the tractor being shown in broken outline form, and including transmission 26, a pair of drive wheels 28 (only one being shown), a set 30 and a steering wheel 32. Hitch 22 is connected to the tractor by a pivoted fixture 34 mounted on a pivot pin 36 at the rear of the tractor and controlled by a manually operated lever 38 to shift the tiller between its inoperative position shown in FIGURE 1 to its operating position shown in FIGURE 2. It will be noted that rearwardly extending member 40 of fixture 34 is substantially horizontal when the tiller is in its operating position, and is lifted from the horizontal position to an upwardly extending position when the tiller is in its inoperative position as seen in FIGURE 1. While certain suburban tractors are particularly adapted for pulling and operating the present tiller, other types of power equipment may be used with or without fixture 34 or a similar mechanism.

Figure 13:
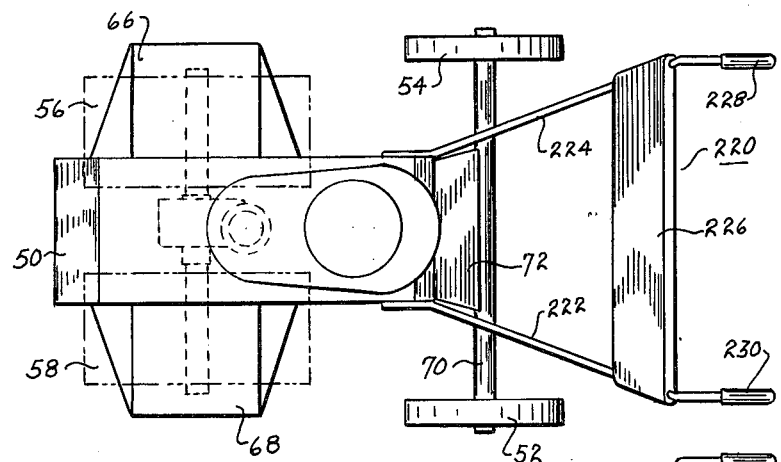
FIGURE 13 is a top plan view of the manually controlled unit shown in FIGURE 12.

The tiller consists generally of a bed or frame 50, a pair of rear wheels 52 and 54 for supporting bed 50, two sets of rotary blades 56 and 58, driven by a motor 60, mounted on bed 50 and operatively connected to the rotary blades by a power drive mechanism, generally designated by numeral 62 and a clutch 64. As seen in FIGURE 13, guards 66 and 68 are positioned above rotary blade sets 56 and 58, respectively, and are rigidly attached to the sides of bed 50. Wheels 52 and 54 are mounted on an axle 70, which in turn is connected to the rear end of bed 50 by a support structure 72, consisting primarily of a rigid metal panel welded at its lower end to axle 70, and at its upper end to the rear end of the bed.

Figure 4:
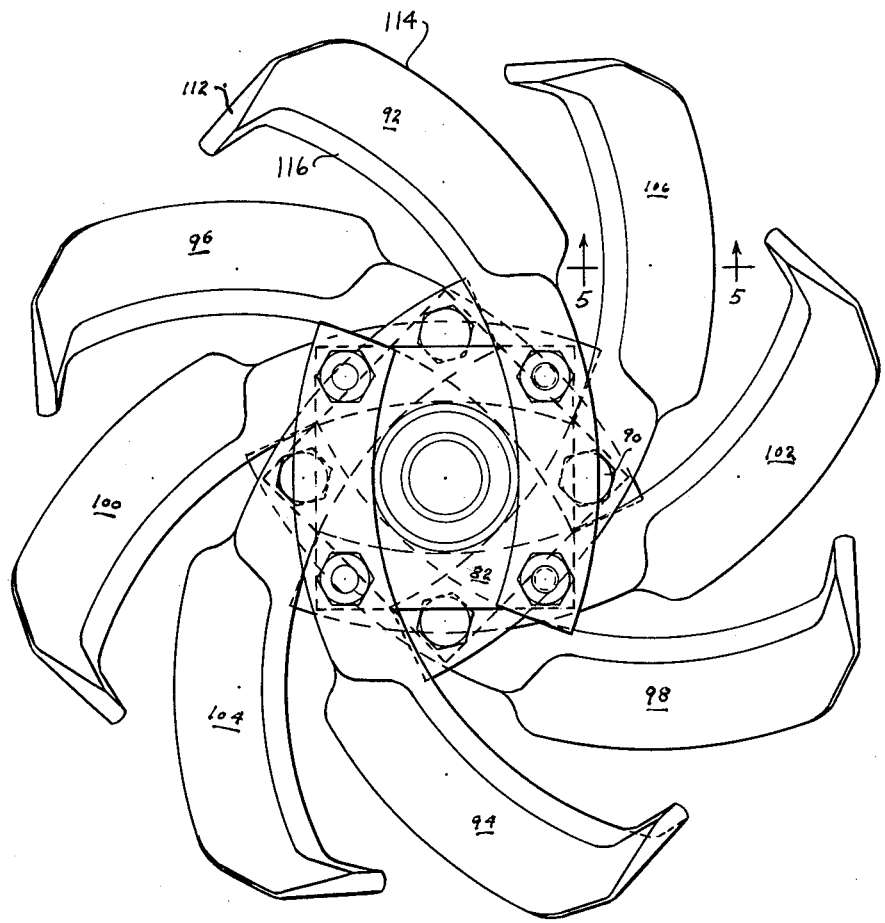
FIGURE 4 is a vertical cross sectional view, taken on line 4—4 of FIGURE 3 showing the inner end of a set of rotary blades.
Figure 5:
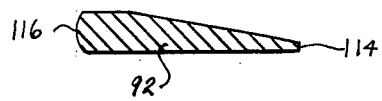
FIGURE 5 is a transverse cross sectional view of one of the blades on the set thereof shown in FIGURE 4, taken on line 5—5 of the latter figure.

One of the principal features of the present invention is the particular design and construction of the two sets of rotary blades, consisting of an axle 80 having four plates 82, 84, 86 and 88 rigidly secured thereto by welding or other suitable means. The plates are preferably substantially square and contain a center hole for receiving axle 80. These plates are normally equally spaced from one another on axle 80, and the axle and plates together form a rigid, permanent base for the blades, each plate containing or supporting two blades secured rigidly to the respective plate by two bolts 90. Plates 82 and 84 are positioned at a 45° angle from each other, and plates 86 and 88 are placed at the same angle as plates 82 and 84, respectively, and plate 86 is positioned at a 45° angle from plate 88. Plate 82 contains two blades 92 and 94, extending in opposite directions and secured to opposite edges but on the same side of plate 82. Plate 84 supports blades 96 and 98, plate 86 supports blades 100 and 102, and plate 88 supports blades 104 and 106, the two blades on the respective plates being secured thereto in the same relative positions as blades 92 and 94 are on plate 82. FIGURE 4 illustrates the position assumed by the eight blades on each set, and illustrates the manner in which the blades become effective or dig into the ground successively, one from the other, as the particular set of blades is rotated. In addition to the positioning of the blades angularly with respect to one another from one plate to the other, the shape of the blades is important, each consisting of a forwardly curved portion 110, and a laterally extending, relatively long tip 112. The forward edge 114 of each blade is relatively thin throughout its entire length, the blade being tapered from edge 114 to a relatively thick rear edge 116. While a space is provided between the blades of each plate, the space is sufficiently small that any earth between the blades is effectively worked even though direct contact by the blades is not effected. Further, it is noted that blades 92 and 94 of plate 82 extend inwardly to within a short distance of a relatively thin support web 118 of power drive mechanism 62, thus leaving a relatively small space between the ends of blades 92 and 94 on one set of rotary blades, and the ends of the respective blades on the other set of rotary blades positioned on the opposite side of power drive mechanism 62. It is thus seen that while the two sets are spaced from one another and separated by the power drive mechanism 62, the blades 92 and 94 on plates 82 of the two sets are sufficiently close together that the earth between the respective blades is thoroughly worked during the operation of the tiller, thus providing efficient tilling throughout the width of the unit extending from the blades 104 and 106 on plate 88 of one set to the respective blades on the other set. As noted from the foregoing description of the rotary blade sets, the two sets are essentially the same with the exception that the blades on each are positioned with edge 114 forward with respect to the direction of rotation.

Figure 8:
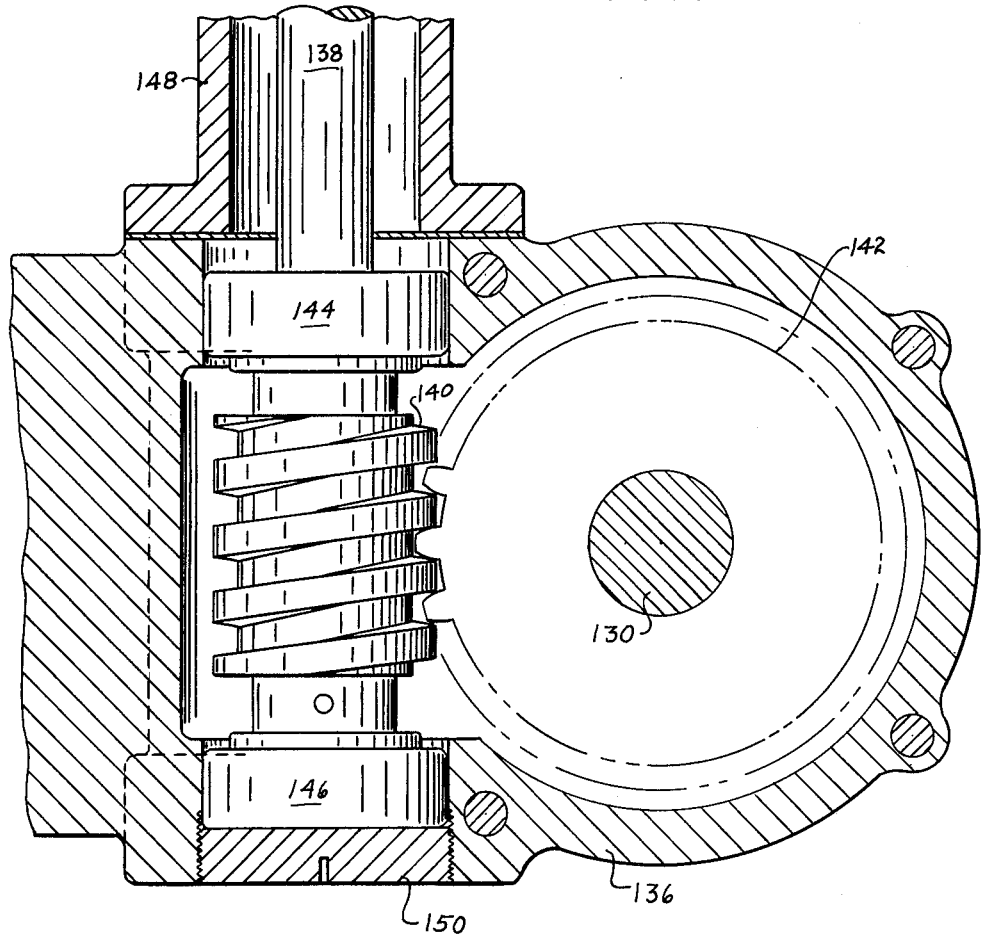
FIGURE 8 is an enlarged vertical cross sectional view of a portion of the drive mechanism for the rotary blade sets, taken on line 8—8 of FIGURE 3.

The two sets of rotary blades 56 and 58 are mounted on the respective ends of shaft 130, journalled in bearings 132 and 134 of drive housing 136. The shaft is driven by motor 60 through clutch 64, vertically disposed shaft 138 (FIGURE 8), worm 140 on the end of shaft 138, and gear 142 mounted on and secured to shaft 130. Shaft 138 is journalled in bearings 144 and 146 mounted in housing 136, the housing being supported on bed 50 by a sleeve 148 secured at its lower end to the housing and at its upper end to the underside of the bed by bolts or other suitable securing means (not shown). An opening closed by a plug 150 is provided in the lower part of the housing to facilitate the assembling of the bearings into the housing. Web member 118 is rigidly attached at one end to housing 136, and at the other end to axle 70 to form a reinforcing structure primarily for the rear support wheels 52 and 54 and axle 70. This web likewise gives some additional lateral support to the housing 136 and sleeve 148 in supporting the two sets of rotary blades. Shaft 138 extends upwardly through sleeve 148 and through an upper bearing 152 into bed 50, and is connected to the motor by a belt 154 around pulleys 156 and 158, the former pulley being mounted on shaft 160 of motor 60 for rotation therewith, and the latter being mounted on the upper end of shaft 138 for rotation therewith.

Figure 12:
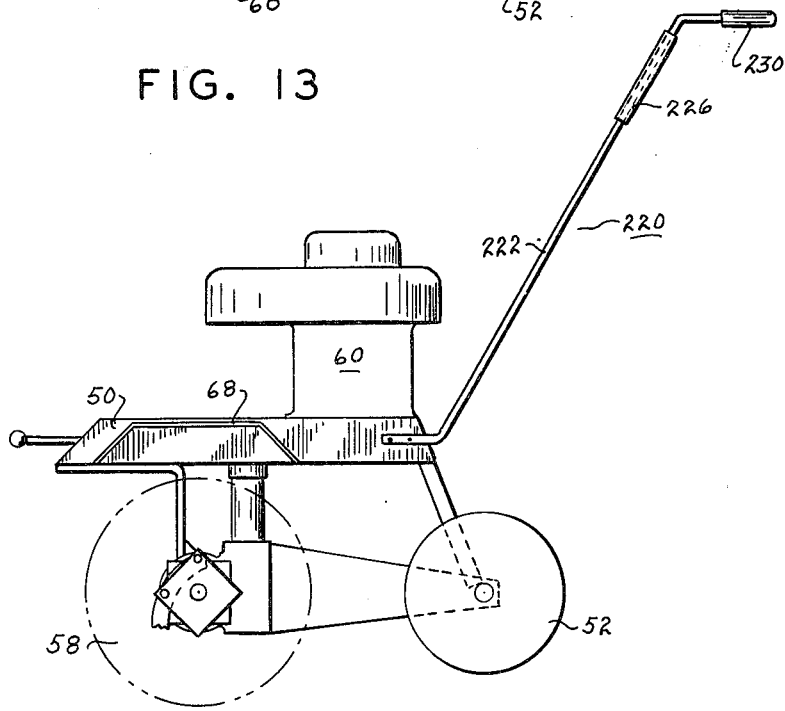
FIGURE 12 is a side elevational view of the tiller showing a handle attachment for manually operating the implement.

Belt 154 is somewhat longer than the length required to properly drive pulley 158 from pulley 156, and an idle pulley 162 is employed to place sufficient tension on the belt to prevent slippage on pulley 156, and thereby drive pulley 158. This serves as an effective clutch for the drive mechanism and is controlled by an L-shaped lever 164, one arm 164A of which rotatably supports idle pulley 162, and the other arm 164B of which is connected to an operating rod 166, extending longitudinally through bed 50 and projecting through openings 168 and 170 in the ends of the bed. Rod 166 contains an operating handle 172 mounted on the front end thereof in easy reach of the operator on the tractor. The other end of rod 166 may also contain an operating handle, since in one modified form the unit is manually controlled with handles thereof extending rearwardly from the unit as shown in FIGURES 12 and 13. When rod 166 is moved longitudinally from left to right as viewed in FIGURE 6, idle pulley 162 is pushed outwardly placing sufficient tension on belt 154 to drive pulley 158, and thereby drive shaft 138, worm 140 and gear 142, shaft 130, and thereby drive the two sets of rotary blades 56 and 58. The rod 166 is held in the position to retain idle pulley 162 in its operating position by a suitable and well known escapement and latching means, shown at numeral 174, contained in and supported by bed 50. In order to release rod 166 and permit the idle pulley 162 to return to its inoperative position, handle 172 and rod 166 are rotated sufficiently to release the latch means 174, and thereby permit spring 176 to return the rod and pulley to their original inoperative positions, the spring 176 reacting between a shoulder 178 on the rod and a lug 180 attached to bed 50.

Lever 164 is mounted pivotally on a boss 182, and secured thereon by a bolt 184 extending downwardly through the lever and boss 182 and through the bottom wall of bed 50. The outer end of arm 164B is operatively connected to rod 166 by a stem 186, supported on the rod by a lug 188, rigidly secured to the rod by a set screw or the like. In order to prevent arm 164B from becoming displaced, a washer 190 and pin 192 are placed on the upper side of the arm. The type of motor shown in the drawings is a gasoline engine of well known construction and operation readily available on the market, and hence will not be described in detail herein. The power output shaft 160 of the engine is vertically positioned and projects downwardly into bed 50.

Hitch 22 consists of a bar 200 pivoted on a horizontally disposed bolt or pin 202, the bolt being supported by an arm 204, which in turn is mounted on a vertically disposed pin 206 rigidly secured to the front end of bed 50, arm 204 being held on pin 206 by a washer 208 and pin 210 on the underside thereof. The opposite or forward end of hitch 22 terminates in a flat rigid member 212 having a hole 214 for receiving a pin, bolt or the like for pivotally securing the end of the hitch to fixture 34. The hitch pivots on a substantially horizontal plane on fixture 34, and is moved between the angular positions shown in FIGURES 1 and 2 by fixture 34 to move the tiller between operating and inoperative positions.

Figure 6:
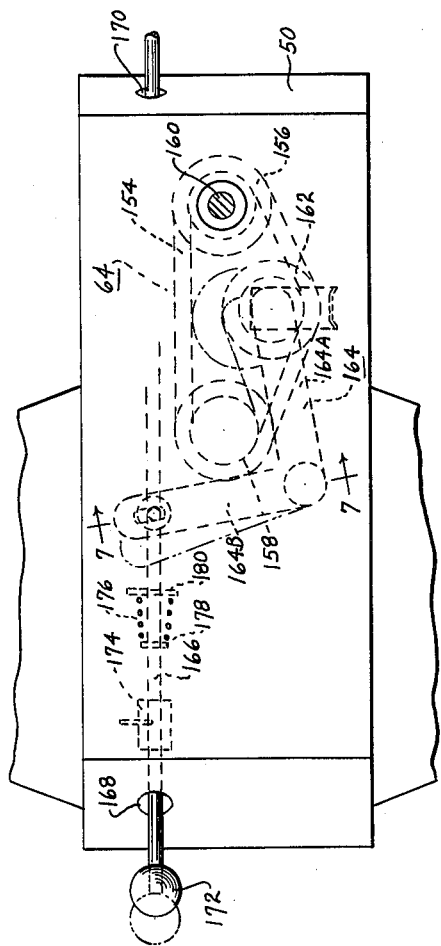
FIGURE 6 is a fragmentary top plan view of my tiller with the motor removed and with the clutch mechanism of the power drive being shown in broken lines.
Figure 7:
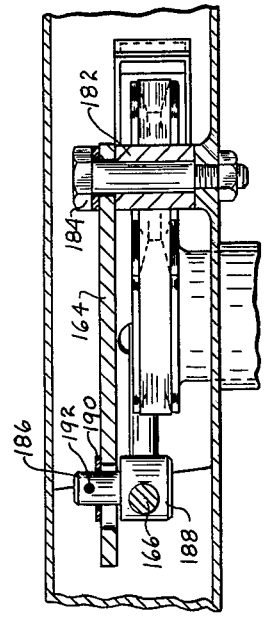
FIGURE 7 is a vertical cross sectional view of the clutch mechanism shown in FIGURE 6, taken on line 7—7 of the latter figure.

In the operation of the present tiller connected to a tractor in the manner shown in FIGURES 1 and 2, the operating lever 38 is pulled forwardly to rotate fixture 34 to the position shown in FIGURE 1, thereby raising the front end of the tiller and permitting it to be supported only by hitch 22 and rear wheels 52 and 54. With the tiller in this position, the rotary blade sets 56 and 58 are completely above the ground, as illustrated. With the tiller in this position, the operator can maneuver the tractor and tiller to any position without interference from the tiller blades. When the tiller has been moved to the area in which the tilling is to be performed, motor 60 is started while clutch 64 is in its disengaged or non-driving position, i.e., with idle pulley 162 moved inwardly to a position approximately directly between pulleys 156 and 158, and pulley 158 will not be driven by the belt. After the motor is running properly, the operator moves lever 38 of the tractor rearwardly, rotating fixture 34 on pivot 36 in the clockwise position, as viewed in FIGURE 1, thereby lowering the tiller to the position shown in FIGURE 2. Lever 166 is moved by the use of handle 172 to the right, as seen in FIGURE 6, thereby moving idle pulley 162 outwardly and placing the required tension on belt 154 to drive pulley 158. Rod 166 is locked in its operating position by latch means 174. As soon as the clutch is engaged in the foregoing manner, the rotary blades operate continuously, digging into the soil sufficiently to thoroughly work the soil and prepare it for planting.

One of the important features of the present invention is the fact that while the tiller is in its operating position, as shown in FIGURE 2, the rotary blades literally float laterally and up and down as the tiller is moved by the tractor, thus fully working the soil and eliminating clods and poorly worked portions throughout the area covered by the tiller. The free floating lateral movement of the rotary blades is accomplished by the use of pivot pin 206 at one end of hitch 22 and pin 216 between the other end of the hitch and fixture 34. The free floating vertical movement is made possible by the transverse pivot formed between hitch 22 and arm 204 by bolt 202 at one end of the hitch and freely moving fixture 34 on pivot pin 36 on the tractor at the other end of the hitch when the fixture 34 is in its lower position of FIGURE 2. It is important in accomplishing both the vertical and lateral free floating movements that the rotary blade sets form their own and sole support and that no supporting wheels or the like are between them and the tractor. Rear wheels 52 and 54 provide the steadying influence required to maintain the tiller in proper position behind the tractor. When the operator wishes to discontinue the tilling operation, he merely pulls lever 38 forwardly, thus rotating fixture 34 in a counter-clockwise direction, thereby lifting hitch 22 and the front end of the tiller, where it is held in locked position until it is intentionally lowered by the operator. With the tiller in this position, as shown in FIGURE 1, the blades are above the surface of the ground and will continue to rotate while the tiller is being maneuvered to a new position. Fixture 34 with pivots 36 and 216 and hitch 22 forms a part of the operative structure of the tiller, and when it is in its lowered position, as shown in FIGURE 2, it is free to oscillate on horizontally positioned pivot pin 36.

While the present tiller is designed primarily for use in conjunction with a tractor or other similar power operated apparatus, it may be used as a manually controlled unit by the use of a handle structure such as that shown at numeral 220 in FIGURES 12 and 13. Since the remainder of the unit is the same as that previously described, only the handle will be described here, the handle consisting of two upwardly extending bars 222 and 224, the two rods being rigidly attached at their lower ends to the sides of bed 50, and connected adjacent their upper ends by a cross member 226. The two rods extend beyond cross member 226, and form handles 228 and 230. The operator can easily maneuver the tiller by tilting it rearwardly on wheels 52 and 54 until the blades are above the surface of the ground.

While only one embodiment of the present invention has been described in detail therein, various changes and modifications may be made without departing from the scope of the invention.

We claim:
1. A tiller pulled by a towing vehicle, comprising a bed, an axle positioned beneath the rear end of said bed, two wheels on said axle, two axially aligned transversely arranged sets of rotary blades, a shaft rotatably supporting said blade sets, a motor mounted on said bed and having a drive shaft, a power drive mechanism connecting said motor to said blade sets including a gear on said first mentioned shaft, a worm for driving said gear, a shaft for said worm, a pulley on said drive shaft, a pulley on said worm shaft, a belt on said pulleys, an idle pulley for said belt, a lever supporting said idle pulley on one end, a control means connected to the other end of said lever for moving said idle pulley to and from a belt tensioning position, a releasable latch for said control means, a housing for said gear and worm connected to said bed, a member connecting said housing with said axle structure, a hitch on the forward end of said bed for pulling said tiller and lifting said blade sets from the ground, having an elongated member pivoted at its forward end on a horizontal axis fixed relative to the towing vehicle and at its rearward end on a vertical axis fixed relative to said bed and pivoted on vertical and horizontal axes at the forward and rearward ends, respectively, between said first two mentioned axes and an operating lever connected to said hitch between said first mentioned horizontal axis and said last mentioned vertical to move the portion of the hitch therebetween angularly on a vertical plane.

2. A tiller pulled by a towing vehicle, comprising a bed, an axle positioned beneath the rear end of said bed, two wheels on said axle, two axially aligned transversely arranged sets of rotary blades, a shaft rotatably supporting said blade sets, a member connecting said blade shaft to said bed, a motor mounted on said bed, a power drive mechanism including a clutch connecting said motor to said blade sets, a hitch on the forward end of said bed for pulling said tiller and lifting said blade sets from the ground, having an elongated member pivoted at its forward end on a horizontal axis fixed relative to the towing vehicle and at its rearward end on a vertical axis fixed relative to said bed and pivoted on vertical and horizontal axes at the forward and rearward ends, respectively, between said first two mentioned axes and an operating lever connected to said hitch between said first mentioned horizontal axis and said last mentioned vertical to move the portion of the hitch therebetween angularly on a vertical plane.

3. A soil working implement pulled by a towing vehicle, comprising a frame, an undercarriage positioned beneath the rear end of said frame, two axially aligned transversely arranged sets of rotary blades, a shaft rotatably supporting said blade sets, a member connecting said blade shaft to said frame, a motor mounted on said frame, a power drive mechanism connecting said motor to said blade sets, a hitch on the forward end of said frame for pulling said soil working implement and lifting said blade sets from the ground, having an elongated member pivoted at its forward end on a horizontal axis fixed relative to the towing vehicle and at its rearward end on a vertical axis fixed relative to said frame and pivoted on vertical and horizontal axes at the forward and rearward ends, respectively, between said first two mentioned axes and an operating lever connected to said hitch between said first mentioned horizontal axis and said last mentioned vertical to move the portion of the hitch therebetween angularly on a vertical plane.

4. A soil working implement pulled by a towing vehicle, comprising a frame, an undercarriage positioned beneath the rear end of said frame, wheels on said undercarriage, a set of rotary blades, a motor mounted on said frame, a power drive mechanism connecting said motor to said blade set, a hitch on the forward end of said frame for pulling said soil working implement and lifting said blade set from the ground, having an elongated member pivoted at its forward end on a horizontal axis fixed relative to the towing vehicle and at its rearward end on a vertical axis fixed relative to said frame and pivoted on vertical and horizontal axes at the forward and rearward ends, respectively, between said first two mentioned axes and an operating lever connected to said hitch between said first mentioned horizontal axis and said last mentioned vertical to move the portion of the hitch therebetween angularly on a vertical plane.

5. A soil working implement pulled by a towing vehicle, comprising a frame, an undercarriage positioned beneath said frame, a set of rotary blades operatively connected to said frame, a power means on said frame for driving said blade set, a hitch on the forward end of said frame for pulling said soil working implement and lifting said blade set from the ground, having an elongated member pivoted at its forward end on a horizontal axis fixed relative to the towing vehicle and at its rearward end on a vertical axis fixed relative to said frame and pivoted on vertical and horizontal axes at the forward and rearward ends, respectively, between said first two mentioned axes and an operating lever connected to said hitch between said first mentioned horizontal axis and said last mentioned vertical to move the portion of the hitch therebetween angularly on a vertical plane.

6. The combination of a soil working implement pulled by a towing vehicle, and having a frame, an undercarriage positioned beneath said frame at the rear thereof, a set of rotary blades operatively connected to said frame, a power means on said frame for driving said blade set, a hitch on the forward end of said frame for pulling said soil working implement and lifting said blade set from the ground, having an elongated member pivoted at its forward end on a horizontal axis fixed relative to the towing vehicle and at its rearward end on a vertical axis fixed relative to said frame and pivoted on vertical and horizontal axes at the forward and rearward ends, respectively, between said first two mentioned axes and an operating lever connected to said hitch between said first mentioned horizontal axis and said last mentioned vertical to move the portion of the hitch therebetween angularly on a vertical plane.

7. The combination of a soil working implement pulled by a towing vehicle, and having a frame, a set of rotary blade operatively connected to said frame, a power means on said frame for driving said blade set, a hitch on the forward end of said frame for pulling said soil working implement and lifting said blade set from the ground, having an elongated member pivoted at its forward end on a horizontal axis fixed relative to the towing vehicle and at its rearward end on a vertical axis fixed relative to said frame and pivoted on vertical and horizontal axes at the forward and rearward ends, respectively, between said first two mentioned axes and an operating lever connected to said hitch between said first mentioned horizontal axis and said last mentioned vertical to move the portion of the hitch therebetween angularly on a vertical plane.

8. The combination of a soil working implement pulled by a towing vehicle, and having a frame, a set of rotary blades operatively connected to said frame, a power means on said frame for driving said blade set, a hitch on the forward end of said frame for pulling said soil working implement and lifting said blade set from the ground, having an elongated member pivoted at its forward end on a horizontal axis fixed relative to the towing vehicle and at its rearward end on a vertical axis fixed relative to said frame and pivoted on vertical and horizontal axes at the forward and rearward ends, respectively, between said first two mentioned axes and an operating lever connected to said hitch between said first mentioned horizontal axis and said last mentioned vertical to move the portion of the hitch therebetween angularly on a vertical plane.

9. The combination of a soil working implement pulled by a towing vehicle, and having a frame, a set of rotary blades operatively connected to said frame, a power means on said frame for driving said blade set, a hitch on the forward end of said frame for pulling said soil working implement and lifting said blade set from the ground, having an elongated member pivoted at its forward end on a horizontal axis fixed relative to the towing vehicle and at its rearward end on a vertical axis fixed relative to said frame and pivoted on vertical and horizontal axes at the forward and rearward ends, respectively, between said first two mentioned axes and an operating lever connected to said hitch between said first mentioned horizontal axis and said last mentioned vertical to move the portion of the hitch therebetween angularly on a vertical plane.

References Cited by the Examiner

UNITED STATES PATENTS

| | | | |
|---|---|---|---|
| 141,145 | 7/73 | Kugler | 172—677 |
| 1,387,725 | 8/21 | Johnson | 172—540 |
| 1,699,151 | 1/29 | Miller et al. | 172—540 |
| 1,940,061 | 12/33 | Paul | 280—492 |
| 2,322,342 | 6/43 | Bunn | 172—680 |
| 2,531,768 | 11/50 | Cline et al. | 172—680 |
| 2,586,032 | 2/52 | Haley | 172—322 X |
| 2,658,436 | 11/53 | Gatti | 172—56 |
| 2,695,071 | 11/54 | Hupp | 172—42 |
| 2,765,719 | 10/56 | Day et al. | 172—76 |
| 2,793,576 | 5/57 | Carpi | 172—56 |
| 2,847,924 | 8/58 | Quick | 172—42 X |
| 2,903,077 | 9/59 | Kamlukin | 172—42 |
| 2,943,687 | 7/60 | Merry et al. | 172—123 |
| 2,975,839 | 3/61 | Burrows et al. | 172—125 |

FOREIGN PATENTS

| | | |
|---|---|---|
| 209,268 | 7/57 | Australia. |
| 1,018,398 | 10/52 | France. |
| 1,077,393 | 4/54 | France. |
| 437,359 | 11/26 | Germany. |

ABRAHAM G. STONE, *Primary Examiner.*

T. GRAHAM CRAVER, *Examiner.*